(12) United States Patent
Strange et al.

(10) Patent No.: US 9,683,593 B1
(45) Date of Patent: Jun. 20, 2017

(54) STEP BOLT CONNECTOR ASSEMBLY

(71) Applicant: Allfasteners USA, LLC, Cleveland, OH (US)

(72) Inventors: Michael Strange, Brook Park, OH (US); Bruce A. Carmichael, Bay Village, OH (US)

(73) Assignee: Allfasteners USA, LLC, Medina, OH (US)

( * ) Notice: Subject to any disclaimer, the term of this patent is extended or adjusted under 35 U.S.C. 154(b) by 105 days.

(21) Appl. No.: 14/727,021

(22) Filed: Jun. 1, 2015

Related U.S. Application Data

(63) Continuation of application No. 14/705,185, filed on May 6, 2015, now abandoned.

(60) Provisional application No. 62/102,920, filed on Jan. 13, 2015, provisional application No. 62/079,921, filed on Nov. 14, 2014, provisional application No. 62/069,797, filed on Oct. 28, 2014, provisional application No. 62/009,357, filed on Jun. 9, 2014, provisional application No. 62/000,225, filed on May 19, 2014.

(51) Int. Cl.
*F16B 37/00* (2006.01)
*F16B 33/00* (2006.01)

(52) U.S. Cl.
CPC .................................. *F16B 33/00* (2013.01)

(58) Field of Classification Search
CPC ...................................................... F16B 33/00
USPC ..................................... 411/427; 182/90, 92
See application file for complete search history.

(56) References Cited

U.S. PATENT DOCUMENTS

| | | | | |
|---|---|---|---|---|
| 490,362 A | * | 1/1893 | Rich | E06C 9/04 182/90 |
| 1,062,015 A | * | 5/1913 | Lane | F16L 5/10 285/139.1 |
| 1,703,232 A | * | 2/1929 | Gunn | B21D 53/00 148/208 |
| 4,214,792 A | * | 7/1980 | Hardwicke | B60B 11/02 301/36.1 |

(Continued)

*Primary Examiner* — Gary Estremsky
(74) *Attorney, Agent, or Firm* — Luedeka Neely Group, P.C.

(57) ABSTRACT

A step bolt connector and bolt assembly creates steps on a structure for accommodating a worker's boot. A first threaded bore is formed in a cylindrical end of a step bolt connector and this first threaded bore is threaded onto an exposed bolt on a structure. A sight hole extends from the exterior of the connector to the inward end of the first threaded bore for visually checking to see if the bolt is adequately attached in the first bore. A recess is formed in the cylindrical end and the recess is dimensioned to fit over fastening nut on the exposed bolt on the structure. When the first threaded bore is screwed onto the exposed bolts on the structure, the recess at least partially surrounds shields and protects the fastening nut on the exposed end of the bolt. A second threaded bore is formed in a second end (a truncated conical end) of the connector, and a step bolt is secured in the second threaded bore. The step bolt is dimensioned so that the step bolt when fastened to the connector forms a step on the structure having a length greater than the width of the workers boot. In this manner, a convenient step is formed on the structure for use in climbing the structure to perform repairs, maintenance or modifications.

8 Claims, 6 Drawing Sheets

(56) References Cited

U.S. PATENT DOCUMENTS

| | | | | |
|---|---|---|---|---|
| 4,636,125 A * | 1/1987 | Burgard | ................ | A01M 31/00 |
| | | | | 411/389 |
| 4,650,276 A * | 3/1987 | Lanzisera | ............ | G02B 6/3855 |
| | | | | 385/88 |
| 4,967,460 A * | 11/1990 | Runyan | ................ | B25B 27/064 |
| | | | | 29/252 |
| 5,491,935 A * | 2/1996 | Coxum | .................... | E04B 7/02 |
| | | | | 52/105 |
| 6,367,205 B2 * | 4/2002 | Cornett, Sr. | ............. | E04B 7/02 |
| | | | | 52/223.13 |
| 7,665,940 B2 * | 2/2010 | Nilsen | ....................... | F16B 7/06 |
| | | | | 411/13 |
| 7,887,274 B2 * | 2/2011 | Catlin | .................... | F16B 37/00 |
| | | | | 411/427 |
| 8,206,071 B1 * | 6/2012 | Johnson | ................ | B25B 13/065 |
| | | | | 411/178 |
| 2010/0086378 A1 * | 4/2010 | Lin | ........................ | F16B 37/00 |
| | | | | 411/436 |

* cited by examiner

STEP BOLT CONNECTOR ASSEMBLY

FIELD

This invention relates to the field of mechanical hardware more particularly, this invention relates to a specialized threaded assembly for producing a step on a structure.

CROSS REFERENCE TO RELATED APPLICATIONS

This application claims priority to and makes reference to the following applications: U.S. non-provisional application Ser. No. 14/705,185, filed May 6, 2015, entitled Step Bolt Connector Assembly, invented by Michael Strange and Bruce A. Carmichael; U.S. provisional application 62/000, 225, filed May 19, 2014; U.S. provisional application 62/009,357, filed Jun. 9, 2014; U.S. provisional application 62/069,797, filed Oct. 28, 2014; U.S. provisional application 62/079,921, filed Nov. 14, 2014; and U.S. provisional application 62/102,920, filed Jan. 13, 2015. Each of the aforementioned applications is incorporated by reference herein as if fully and completely copied into this document.

BACKGROUND

Large construction structures often need to be scaled for various purposes. For example, large towers are often scaled to change or improve equipment, modify or reinforce the structure of the tower, and maintain the tower. In one particular type of tower, the cell phone tower, new innovations and increased demands have created a need to add additional weight to the cell phone tower. Often, it is necessary or desirable to reinforce the cell phone tower to accommodate the additional weight. One technique for reinforcement uses blind bolts. The head of the blind bolt is inserted into a bore terminating at an inaccessible area and a folded split washer is expanded on the bolt adjacent to the head to prevent the head from exiting the bore. By this technique, the head of the blind bolt is secured within the tower. Then, a nut is secured to the opposite end of the blind bolt to secure the bolt to the tower. Typically, the blind bolt is securing reinforcing structure or additional equipment to the original tower. Of course blind bolts may be used for a variety of different purposes on a variety of different structures.

From the above discussion it will be apparent that blind bolts provide exposed bolts and nuts on the exterior of the structure. Typically, the threaded shaft of the blind bolt will extend through the mechanical nut for a distance of three quarters of an inch to one and one half inch (0.75"-1.5"). In many structures, conventional bolts will also be used to secure the structure together and those bolts will also provide exposed threaded bolts and fastening nuts on the exterior of the structure.

SUMMARY

The applicant has discovered a way to make these exposed threaded bolts useful. In addition, the applicant has discovered a blind bolt assembly for securing structural reinforcement or equipment to a structure and also creating a step on the exterior of the structure that is useful in climbing the structure.

In accordance with one embodiment of the present invention, a step bolt connector and bolt assembly creates steps on a structure for accommodating a worker's boot. Bolts are secured to the structure with threaded ends of the bolts exposed and nuts securing the bolts to the structure. The assembly includes a step bolt connector. A first threaded bore is formed in the main body of the connector and is dimensioned and threaded to fit one of the bolts and to accept the end of the bolt to a depth sufficient to securely fasten the connector to the bolt. A step bolt is provided having a length sufficient to form a step for a worker climbing the structure and having a threaded second end. A second threaded bore is formed in second end of the main body of the connector, and the second threaded bore is dimensioned to fit the threaded second end of the step bolt and to accept the threaded second end to a depth sufficient to securely fasten the step bolt to the structure. Also, the step bolt is dimensioned so that the step bolt when fastened to the step bolt connector forms a step on the structure having a length greater than the width of the workers boot. In this manner a convenient step is formed on the structure for use in climbing the structure to perform repairs, maintenance or modifications.

In accordance with another aspect of the invention, the step bolt connector has a cylindrical end and a truncated conical end. A recess is formed in the cylindrical end and the recess is dimensioned to fit over at least one of the fastening nuts. When the first threaded bore is screwed onto the exposed bolts on the structure, the recess at least partially surrounds shields and protects the fastening nut on the exposed end of the bolt. When the step bolt is screwed into the truncated conical end of the connector, the conical shape provides a smooth transition between the connector and the step bolt so that the worker's boot fits comfortably on the step bolt. Also, the smooth transition is less likely to snag the boot.

In one embodiment, the step bolt connector has a sight hole extending from the exterior of the bolt connector to the internal end of the first threaded bore. For example, the sight hole may extend from the center of one flat on the connector to the end of the first bore. When the connector is used, the first threaded bore is attached to the end of a bolt extending from a structure. After the connector is threaded onto the bolt and secured with sufficient torque, the sight hole is used to visually check to determine whether the bolt has been threaded into the first threaded bore for a sufficient distance to reach the sight hole. If not, the user may conclude that the step bolt connector is not adequately secured to the bolt, or the user may further test the connection to ensure that the connection is adequate.

In accordance with another aspect of the embodiment, a cavity is formed at the bottom of the first threaded bore. The cavity is dimensioned to receive the projection found at the end of the blind bolt. A blind bolt typically includes a small projection at the end of the bolt that is used to secure the blind bolt into a hole in a structure. This small projection fits into the cavity so as to avoid interfering with the fit between the first threaded bore and the threaded bolt.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1A:
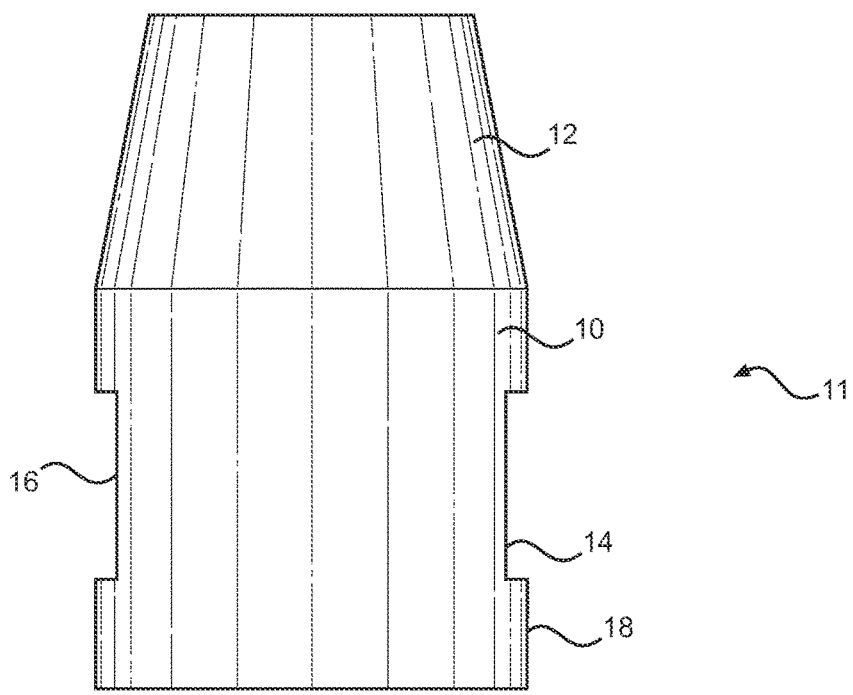
FIG. 1A is a side view of the step bolt connector in a vertical orientation with the truncated end facing upwardly.

Referring now to the drawings in which like reference characters designate like or corresponding characters throughout the several views, there is shown in FIG. 1A a side perspective view of the step bolt connector 11. In this particular view the step bolt connector 11 is shown in a vertical orientation with a cylindrical main body 10 shown at the bottom and a truncated conical end 12 shown at the top of FIG. 1A. The main body 10 includes a pair of opposed flats 14 and 16. These flats are dimensioned to be engaged by a wrench for screwing the connector 11 onto a bolt as will be hereinafter described. In this particular embodiment the distance between flats 14 and 16 is one and 13/16 inches. The height of the flats 14 and 16 as shown in FIG. 1A is 7/8 of an inch. It will be appreciated that these dimensions may be varied according to circumstances.

Figure 1B:
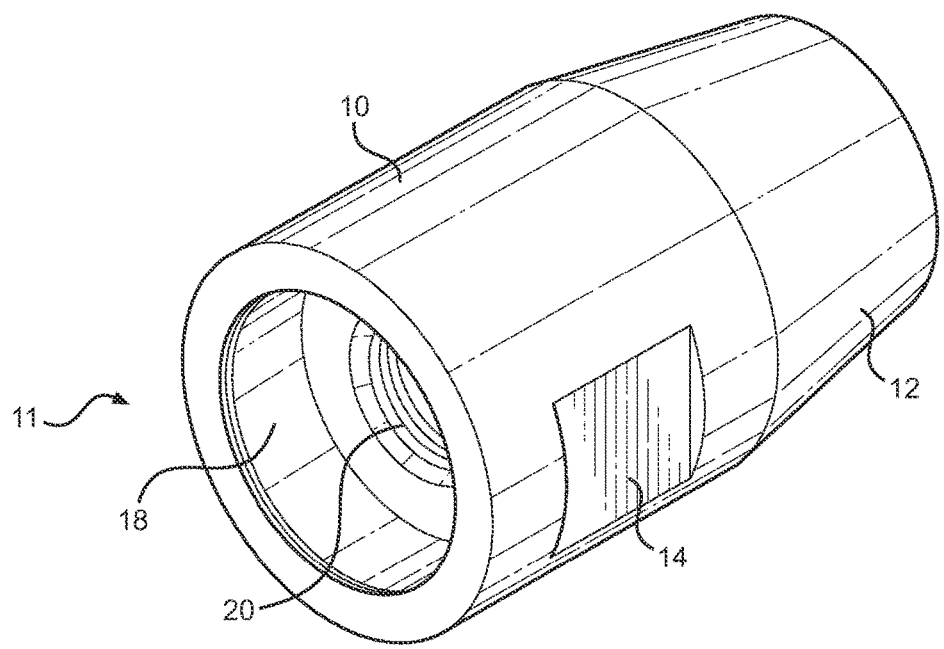
FIG. 1B is a perspective view of the step bolt connector.

In the perspective view of the connector 11 which is shown in FIG. 1B, a recess 18 is shown in the end of the cylindrical main body 10 of the connector 11. This recess is dimensioned to fit around a hexagonal nut on the end of a threaded bolt as will be hereinafter described in greater detail. The wall of the recess 18 is sufficiently strong to easily support a man's weight. The truncated end 12 is dimensioned to provide a smooth interface between the connector 11 and a step bolt.

Figure 1C:
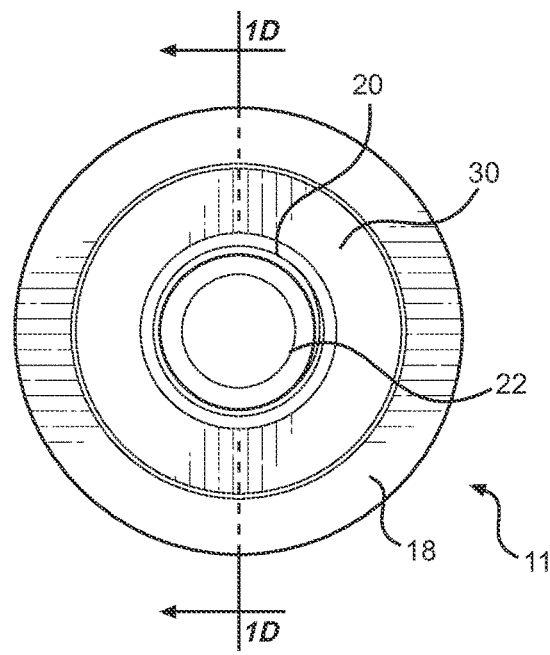
FIG. 1C is a bottom view of the step bolt connector.

Referring now to FIG. 1C, a bottom view of the step bolt connector 11 is shown. In this view, it may be seen that a threaded bore 20 is provided at the bottom of the recess 18. This threaded bore 20 is also visible in FIG. 1D. At the bottom of the threaded bore 20, a cavity 22 is formed for receiving a projection that is typically found at the end of a blind bolt.

Figure 1D:
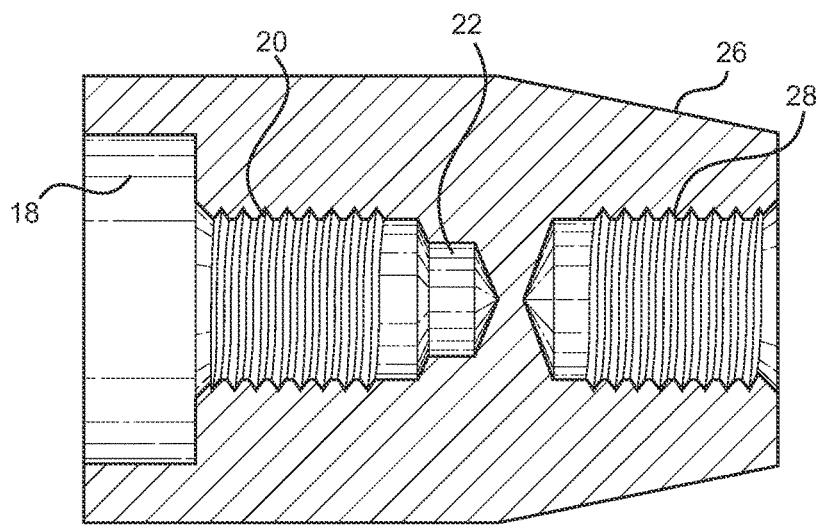
FIG. 1D is a side cross-sectional view of the step bolt connector taken through section line A-A shown in FIG. 1C.

Referring to FIG. 1D, the dimensions of one embodiment are shown in a cross-sectional side view taken through section line A-A shown in FIG. 1C. It is understood that these dimensions are provided for clarity and are not limiting. Also, in this view, a threaded bore 28 is shown. The bore 28 is preferably, but not necessarily, coaxial with both the overall connector 11 and the bore 20. Both threaded bores 20 and 22 are terminated within the connector. Thus, by threading a bolt into the bores all the way to the termination of the bores, if possible, the threaded connection between a bolt and the bores 20 and 28 may be tightened and made secure.

Figure 2:
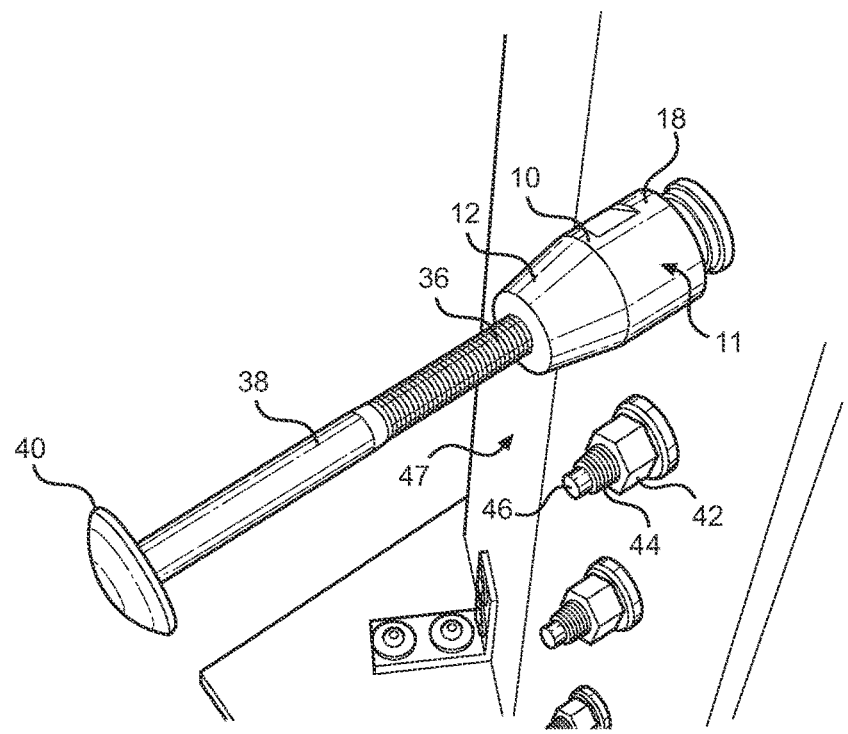
FIG. 2 is a perspective view of the step bolt connector mounted at one end to a bolt on a structure with a step bolt attached to the other end of the connector.
Figure 3:
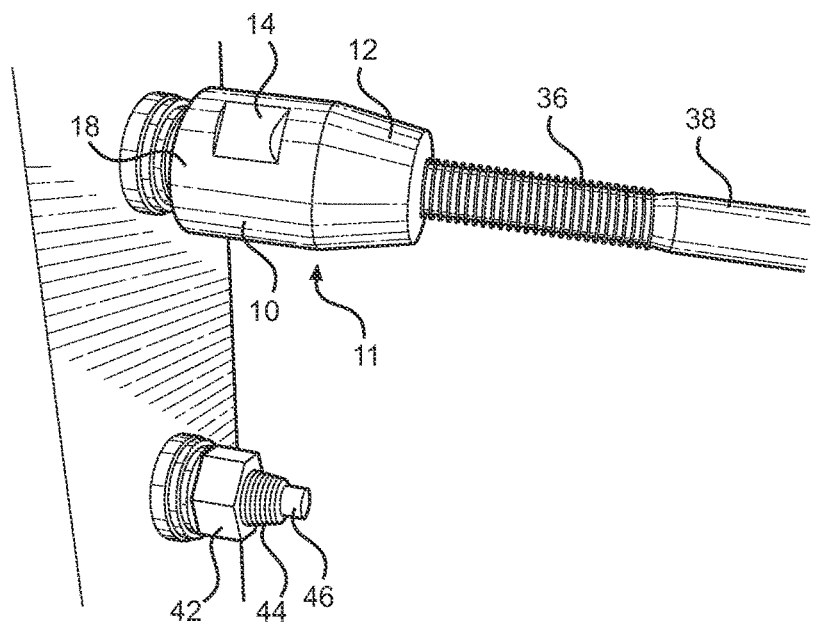
FIG. 3 is a close up view of the step bolt connector mounted at one end to a bolt on a structure with a step bolt attached to the other end of the connector.

A perspective view of the connector 11 is shown in FIG. 2 with a step bolt 38 secured in the tapered end 12 of the connector 11. The step bolt 38 has a first end 40 and a threaded second end 36, and the step bolt 38 is preferably a 4 inch bolt and is dimensioned to easily accommodate the boot of a worker and support the weight of the worker. The cylindrical end 18 of the connector 11 is threaded onto a bolt, such as bolt 44, and the recess 18 partially encloses and shields the nut 42. Although the bolt and nut onto which the connector 11 is secured are not visible in FIGS. 2 and 3, it will be understood that they are identical to the nut 42, bolt 44 and projection 46 that are also shown in FIGS. 2 and 3. Only the threaded second end 36 of the step bolt 38 is mounted to the structure 47 thereby providing a single connection point between the step bolt and the structure. The step bolt 38 extends outwards away from the structure 47 such that the worker's boot may be placed onto the step bolt between the structure and the head of the bolt located at the first end 40.

Also shown in FIGS. 2 and 3 is a projection 46 that extends from the end of bolt 44. This projection is used to hold the blind bolt 44 while the nut 42 is tightened to secure the blind bolt 44 to the structure 47. One example of a structure 47 on which this assembly may be used is a cell phone tower. As previously described, a cavity 18 (FIG. 1B) is formed within the connector 11 to receive the projection 46 so that the projection does not interfere with the threaded connection between the bolt 44 and the connector 11.

A close-up view of the connector 11 is shown in FIG. 3. In this view, the flat 14 is clearly shown. The flat 14 and the opposing flat 16 are used to engage a wrench and thread the connector 11 onto the bolt 44. In this manner the connector 11 is conveniently threaded and secured onto the bolt 44.

Figure 4A:
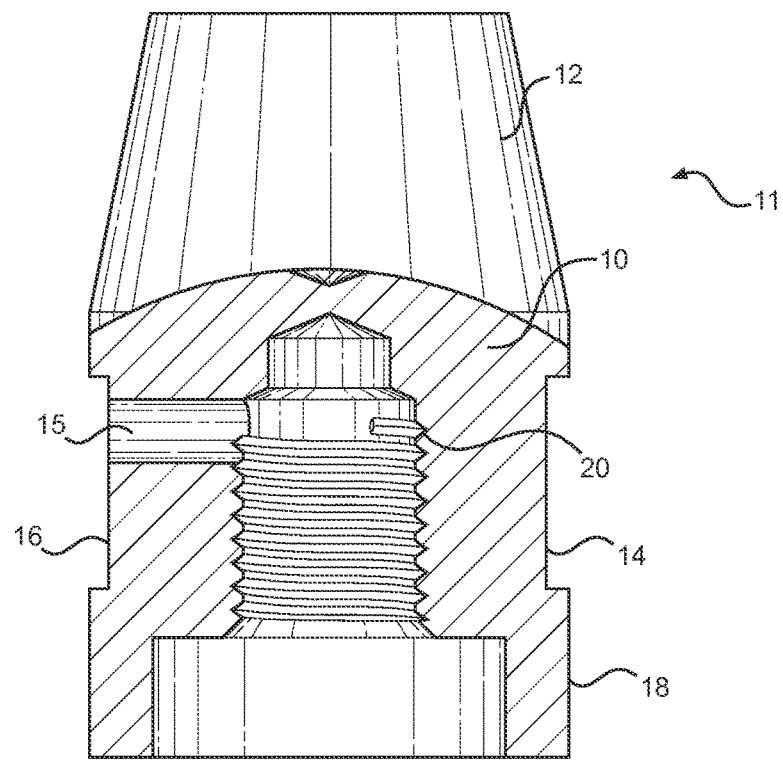
FIG. 4A is a cross sectional view of the connector taken through the center of the connector and the longitudinal center of a flat.
Figure 4B:
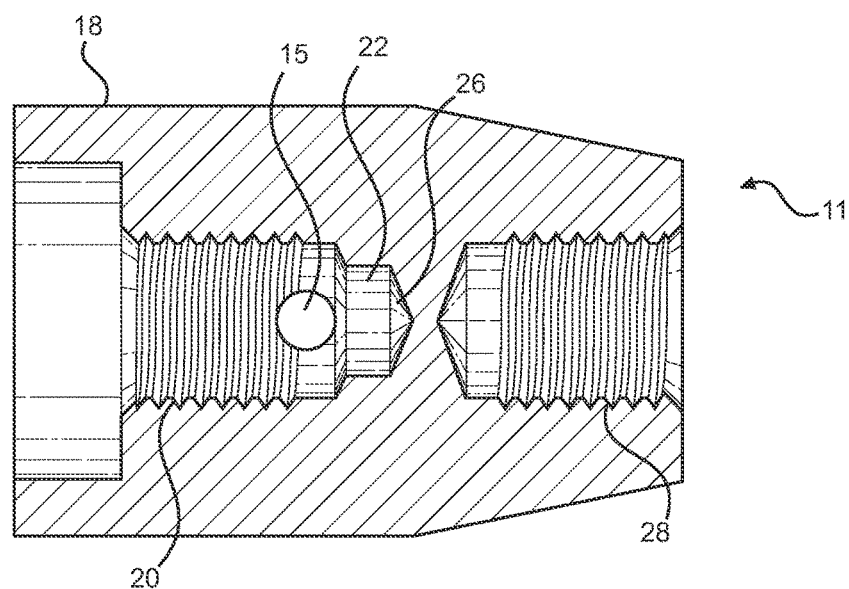
FIG. 4B is a cross sectional view of the connector taken in a plane through the center of the connector in a plane parallel to the flats.

An alternate embodiment of the connector 12 is shown in FIGS. 4A and 4B, which are two cross-sectional views taken through the center of the connector 11. In this embodiment, a sight hole 15 extends from the flat 16 on the outside of the connector 11 to the inward end of bore 20. After applying the connector 11 to a bolt 38 (FIGS. 2 and 3), the user may look into the sight hole and determine whether the bolt 38 extends in the bore 20 to the sight hole. If not, the user may conclude that the connection between the bolt 44 and the connector 11 is insufficient, or the user may test the connection using other techniques. Once the user is satisfied with the connection to the bolt 44, the user threads a bolt 38 into the conical end 12 of the connector 11.

Figure 5:
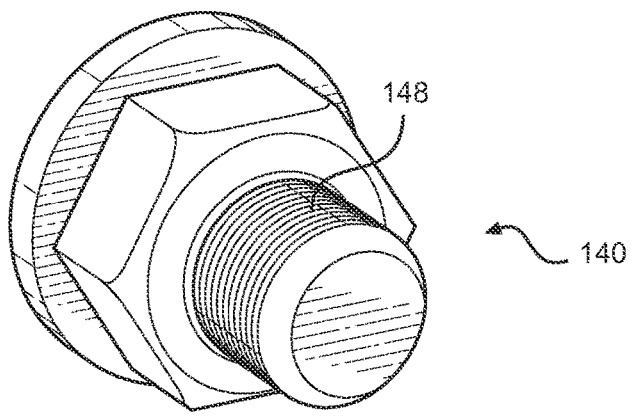
FIG. 5 is a perspective view of a nut and bolt end to which the step bolt connector may be applied.

As mentioned above, the connector may be applied to regular bolts as well as blind bolts. FIG. 5 represents both a blind bolt and a regular bolt. It is a blind bolt that had its tip sheared off during the installation process. Thus, the bolt and nut 140 is similar in ultimate structure to a normal or regular bolt and nut. The connector 11 may be used on bolt and nut 140 in the manner described above.

Figure 6:
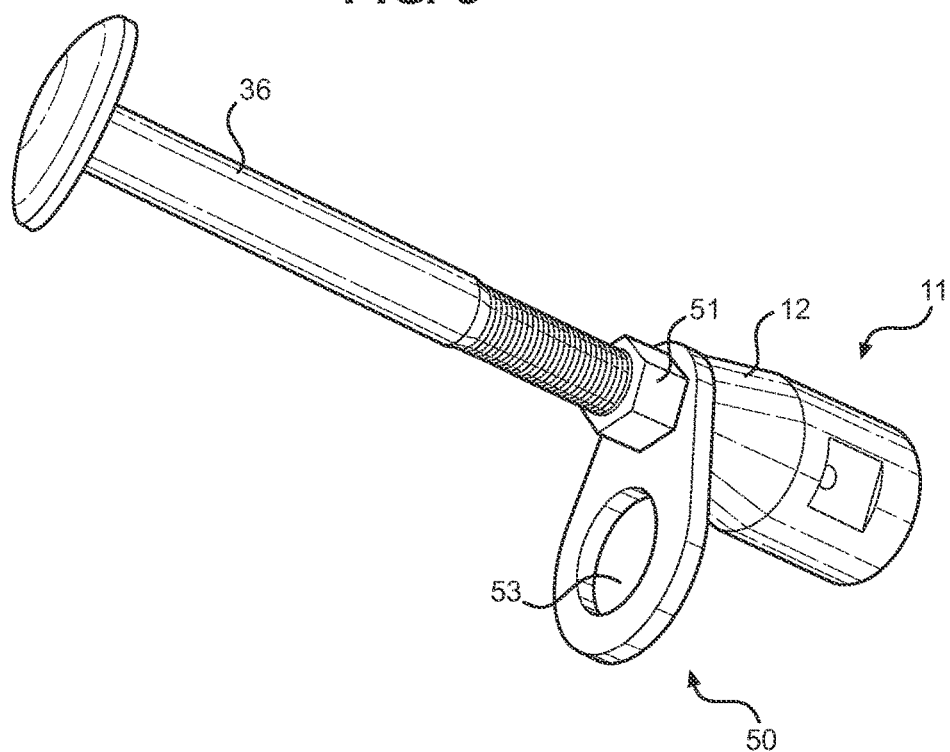
FIG. 6 is a perspective view of a step bolt connector mounted at one end to a bolt and a tie-off point mounted adjacent the truncated end of the step bolt connector.
Figure 7:
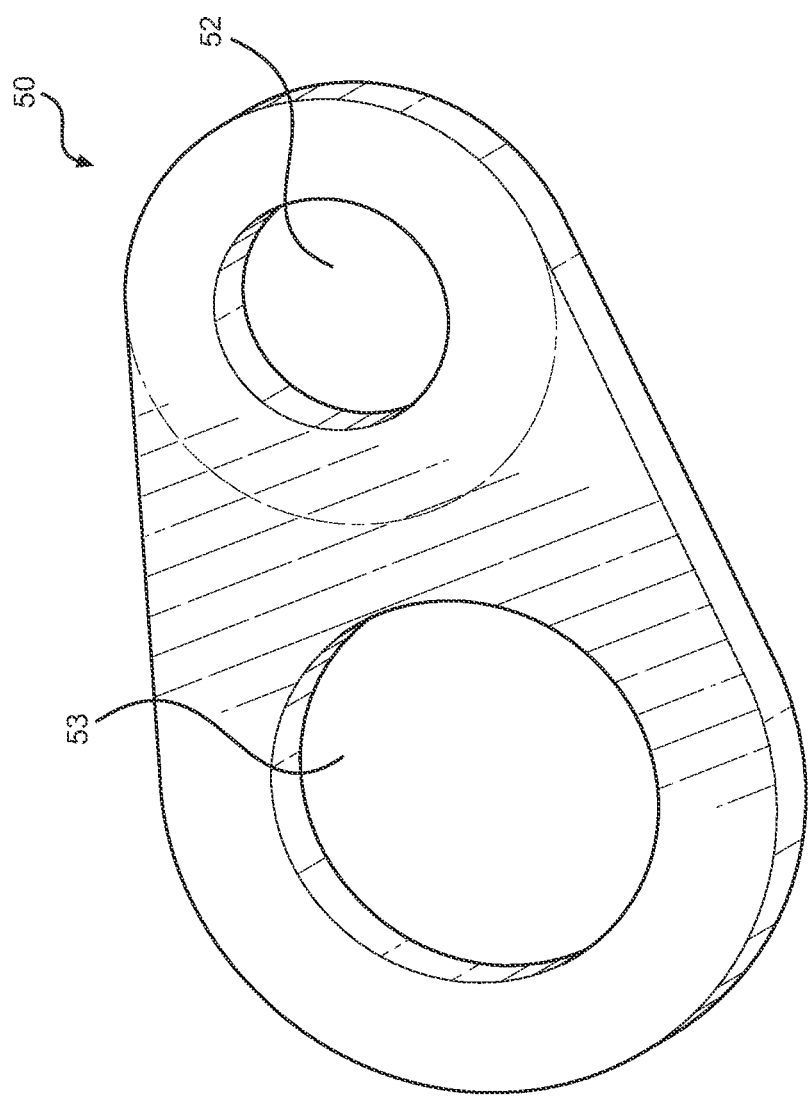
FIG. 7 is a perspective view of a tie-off point configured to be mounted adjacent the truncated end of the step bolt connector.

FIG. 7 provides a top-down view of an optional tie-off 50, which is designed to mount onto the bolt 38 and which provides a location for securely mounting various attachments, such as a harness, tools, etc., to the step bolt. The tie-off 50 includes a first aperture 52 in one end that is dimensioned to slide along the bolt 38. A second, larger aperture 53 is located in the opposite end. FIG. 6 shows the tie-off 50 positioned on the bolt 38 between the conical end 12 of the connector 11 and a nut 51. To install the tie-off 50, the nut 51 is first threaded onto the bolt 38, then the threaded end of the bolt is inserted through the first aperture 52 of the tie-off. The tie-off 50 is slid along the bolt 38 and then the bolt is threaded into the connector 11 as described above. The tie-off 50 is positioned against the connector 11 and is then fixed in place by turning the nut 51.

From the above description, it may be appreciated that the embodiments of the present invention provide a convenient mechanism for forming a step on a structure 47. The connector 11 may be used on the exposed end of either a blind bolt or a conventional bolt that is found on a structure 47. The connector 11 is preferably sold as part of an assembly which includes a blind bolt assembly (a blind bolt 44, split washers, lock washers and other hardware that is necessary or convenient for the installation of the blind bolt 44), a connector 11 and a step bolt 38. Using this assembly the step may be formed on the structure 47 at the same time that the blind bolt 44 is used to secure reinforcing structure or equipment to the structure 47.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A step assembly comprising:
   a. a structure;
   b. bolts secured to the structure with threaded ends of the bolts exposed;
   c. nuts securing the bolts to the structure;
   d. a plurality of step bolt connectors, each step bolt connector having:
      i. a main body having first and second ends;
      ii. a first threaded bore formed in the main body, the first threaded bore being threadably secured to one of the bolts and accepting the end of the bolt to a depth sufficient to securely fasten the connector to the bolt;
      iii. a step bolt having a length sufficient to form a step for a worker climbing the structure and having a threaded second end; and
      iv. a second threaded bore formed in second end of the main body, the second threaded bore being dimensioned to fit the threaded second end of the step bolt and to accept the threaded second end to a depth sufficient to securely fasten the step bolt to the structure, the step bolt being dimensioned so that the step bolt when fastened to the step bolt connector forms a step on the structure having a length greater than the width of the worker's boot,
   e. wherein only the threaded second end of the step bolt is secured to the structure to thereby provide a single connection point between the step bolt and the structure, and wherein a step bolt extends outwardly away from the structure such that the worker's boot may be placed onto the step bolt between the structure and the head of the bolt.

2. The step bolt connector of claim 1 further comprising a sight hole extending from the exterior of the main body to a position adjacent an inward end of the first threaded bore.

3. The step bolt connector of claim 1 further comprising a tie-off having:
   a first end having a first opening configured to mount around a portion of the step bolt; and
   a second end having a second opening sized and configured to receive an attachment.

4. The step bolt connector of claim 3 further comprising a threaded nut for securing the tie-off in place on the step bolt, the nut threaded onto the threaded second end of the step bolt and arranged such that the tie-off is disposed between the conical end of the connector and the nut.

5. A step bolt connector and bolt assembly for creating steps on a structure for accommodating a worker's boot, the structure having bolts secured to the structure with threaded ends of the bolts exposed and nuts securing the bolts to the structure, the assembly comprising:
   a. a step bolt connector having a main body, the main body having a cylindrical end and a truncated conical end;
   b. a recess formed in the cylindrical end dimensioned to fit over at least one of the nuts;
   c. a first threaded bore formed in the main body coaxial with the recess, the first threaded bore being dimensioned and threaded to fit at least one of the bolts and to accept the end of the bolt to a depth sufficient to dispose the recess over the nut so that the recess at least partially shields and protects the nut;
   d. a step bolt having a length sufficient to form a step for a worker climbing the structure, having a head at one end of the step bolt and having a threaded second end,
   e. a second threaded bore formed in truncated conical end of the main body, the second threaded bore being dimensioned to fit the threaded second end of the step bolt and to accept the threaded second end to a depth sufficient to securely fasten the step bolt to the tower, the step bolt being dimensioned so that the step bolt when fastened to the step bolt connector forms a step on the structure having a length greater than the width of the worker's boot.

6. The step bolt connector of claim 5 further comprising a sight hole extending from the exterior of the main body to a position adjacent an inward end of the first threaded bore.

7. A step bolt connector and bolt assembly for creating steps on a structure for accommodating a worker's boot, the structure having blind bolts secured to the structure with threaded ends of the bolts exposed and nuts securing the bolts to the structure, the threaded ends of the blind bolts including projections on the threaded ends having diameters less than the diameters of the threaded ends of the blind bolts, the assembly comprising:
   a. a step bolt connector having a main body, the main body having a cylindrical end and a truncated conical end;
   b. a recess formed in the cylindrical end dimensioned to fit over at least one of the nuts;
   c. a first threaded bore formed in the main body coaxial with the recess, the first threaded bore having a bottom and being dimensioned and threaded to fit at least one of the bolts and to accept the end of the bolt to a depth sufficient to dispose the recess over the nut so that the recess at least partially shields and protects the nut;
   d. a cavity formed at the bottom of the first threaded bore, the cavity being dimensioned to receive the projection on the end of the blind bolt when the blind bolt is fully threaded into the first threaded bore;

e. a step bolt having a length sufficient to form a step for a worker climbing the structure, having a head at one end of the step bolt and having a threaded second end;

f. a second threaded bore formed in truncated conical end of the main body, the second threaded bore being dimensioned to fit the threaded second end of the step bolt and to accept the threaded second end to a depth sufficient to securely fasten the step bolt to the tower, the step bolt being dimensioned so that the step bolt when fastened to the step bolt connector forms a step on the structure having a length greater than the width of the worker's boot.

8. The step bolt connector of claim 7 further comprising a sight hole extending from the exterior of the main body to a position adjacent an inward end of the first threaded bore.

* * * * *